United States Patent Office 3,408,218
Patented Oct. 29, 1968

3,408,218
PROCESS FOR THE MANUFACTURE OF PRINTED OR DYED OBJECTS MADE OF INERT PLASTICS
Arend J. van Muylwijk, Treebeek, Netherlands, assignor to Stamicarbon N.V., Heerlen, Netherlands
No Drawing. Filed Nov. 19, 1964, Ser. No. 412,349
Claims priority, application Netherlands, Nov. 21, 1963, 300,828
7 Claims. (Cl. 117—15)

ABSTRACT OF THE DISCLOSURE

The present disclosure relates to the printing of glossy polyolefin surfaces without causing a special pretreatment of the surfaces which is normally necessary for permitting the acceptance of permanent printing. In the present disclosure, printing is found to be permanent if the surface of the polyolefin is foamed to provide a closed-cellular structure, particularly where the average cell diameter is between 0.01 and 2 mm. No other treatment is necessary.

---

It is well known that ink and paint adhere poorly to the surface of inert plastics, such as polyethylene and polypropylene. As a result, objects made of such plastics cannot easily be printed upon or dyed unless subjected to a pretreatment to improve their adhesive properties so that the ink or paint can adhere to their surfaces. In such treatments the objects are normally superficially oxidized, for example by passing them between two electrodes between which a corona discharge takes place, or by briefly exposing them to the action of a flame.

It has now been found that objects made of inert plastics can be printed or dyed without any pretreatment being required, if such objects, or at least the part to be printed, coated, or dyed, possesses a cellular structure.

The process according to the invention for the manufacture of printed or dyed objects made of inert plastics is consequently characterized in that at least those parts of the objects that are to be printed or dyed possess a cellular structure and the cellular parts are printed or dyed without being subjected to any pretreatment.

Inert plastics are understood to be plastics which, in an unfoamed condition, possess a slight or poor adhesive power with regard to standard printing inks, coatings or dyes.

The term "pretreatment" as used here should be exclusively taken to denote a pretreatment for realizing the printability or dyability of the inert plastic. The application of pretreatments having different effects is consequently not excluded in the process according to the invention.

Examples of plastics to which the process according to the invention can be applied are polyethylene, polypropylene, copolymers of ethylene and propylene, copolymers of either of these with other unsaturated compounds such as unsaturated hydrocarbons, acrylates, methacrylates and vinylesters provided such polymers contain at least 80% by weight of ethylene or propylene, and further mixtures of two or more of the said polymers. The polymers may be mixed with larger or smaller amounts of other substances, such as fillers, antistatic, antioxidizing, lubricating and antiblocking agents.

Such plastic materials may be formed into films or other articles with a cellular structure by using chemical or physical blowing agents. Examples of chemical blowing agents are benzene sulfonyl hydrazide; azodicarbamide; N,N' - dimethyl - N,N' - dinitrosoterephthalic acid amide; N,N'-dinitrosopentamethylene tetramine; 4,4' - diphenyl-disulphonylazide; diazoaminobenzene; azohexanitrobenzonitrile; ammonium oxalate; ammonium-sulfamate; ammoniumbicarbonate; sodium bicarbonate and mixtures of inorganic compounds which react under the action of heat to form a gas, such as mixtures of sodium nitrite and hydrated sodium acetate and of sodium bicarbonate and acid ammonium tartrate. Examples of physical blowing agents are petroleum ether; butane; isobutane; n-pentane; isopentane; neopentane; hexane; heptane; benzene, trichlorofluoromethane; dichlorodifluoromethane; monochlorotrifluoromethane; 1,2 - dichlorotetrafluoroethane; 1-chloro, 1,2, 2-trifluoroethane; methanol; acetone; low-boiling esters, such as methylformate; and mixtures of any two or more of such volatile organic compounds.

The blowing agents may be used alone, or together with nucleating agents, such as finely divided calcium silicate hydrate, exploded mica, carbon black, metal oxides, talc, silica gel, diatomaceous earth, asbestos powder, calcium carbonate or organic substances which solidify at a higher temperature than the polymeric material, such as wholly or partly microcrystalline waxes.

The plastic materials may be foamed according to known processes. Certain processes, which are particularly suited for this purpose are described in the U.S. Patents 3,351,569 and 3,320,188, which are incorporated by reference in this application.

The cell diameter may vary considerably but the best results in printing and dyeing are obtained when the cell diameter is between 0.01 and 2 mm. and particularly between 0.05 and 0.5 mm.

The process according to the invention can be employed for printing or dyeing objects of various sizes and is particularly suited for printing films of foamed polyethylene, foamed polypropylene and foamed copolymers of ethylene and vinylacetate. This can be done by the known paper-printing techniques, such as reel printing, offset printing, copper-plate printing or by typing and stencilling.

The invention is not restricted to the use of special inks or dyes. Surprisingly, it has been found, that if objects have been printed or dyed with, for example, aniline inks, intaglio inks, inks on a dying oil basis and other inks and dyes, the ink is very difficult to remove after drying. When the Scotch Tape test was applied, it was difficult to avoid tearing of the plastics material, but whenever this could be avoided, the printed matter passed this test successfully.

Considering the uneven surface of objects with a cellular structure, it is likewise surprising that even if the objects are printed with a very small letter type or a very fine pattern, a very clear-cut print is obtained.

Objects printed or dyed by the process according to the invention are very waterproof and can be used for various applications. In the form of film, for example, they are well suited as packaging material, waterproof printed paper or waterproof wallpaper. They may also be used as labels for objects that are not printable themselves. In such cases the film bearing the required inscription may be fixed or adhered on the unprintable object, for example on a plastic bag.

The following examples are illustrative, but not definitive, of the present invention.

EXAMPLE 1

1000 g. of high-pressure polyethylene (sp. gr. 0.917, melt index 2) were mixed with 20 g. of an ester wax (tradename: "Hoechst Wachs C") on a Banbury mixer at a temperature of 115° C.

This mixture was granulated and the granulate was immersed in n-pentane at room temperature and atmospheric pressure for 48 hours, after which the granules were separated from the liquid.

Subsequently, the granules were fed to an extruder and the extrudate was blown to film with the result that a closed-cell foamed film was obtained having an apparent density of 0.3 g./cm.³, a thickness of 0.55 mm. and a cell diameter of 0.2 mm.

The film was printed by the customary paper-printing technique, on a normal offset machine. In this way letters and details of drawings were clearly transmitted to the film. The lettering and figures remained unaffected when the film was kept under water for 72 hours.

For comparison a film was blown of the same material, but this time the pentane treatment was omitted with the result that no foamed film was obtained. This film proved to be unprintable.

EXAMPLE 2

730 g. of high-pressure polyethylene (sp. gr. 0.917, melt index 2), 250 g. of magnesium oxide and 20 g. of ester wax of the formula

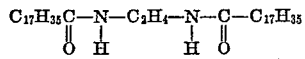

were mixed in a Banbury mixer at 115° C. Following granulation, the mixture was kept immersed in n-pentane overnight at room temperature under atmospheric pressure, after which the granules were separated from the liquid.

The granules were then fed to an extruder and the extrudate was blown to film, whereby a closed-cell foamed film was obtained having an apparent density of 0.25 g./cm.$^3$ and a cell diameter of 0.1 mm.

This film was printed by the same technique as used in Example 1, with equally good results.

EXAMPLE 3

Example 2 was repeated, with the difference, however, that instead of high-pressure polyethylene, a low-pressure polyethylene (sp. gr. 0.953, melt index 0.4) was used and that the ester wax was replaced by an ester wax of the formula

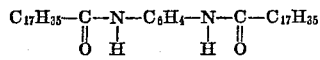

In this case a film was obtained having an apparent density of 0.28 g./cm.$^3$ and a closed cell diameter of 0.15 mm. The film possessed a very good printability.

EXAMPLE 4

A foamed polypropylene film, containing 2% by weight of $SiO_2$ and 20% by weight of chalk, and having an apparent density of 0.26 g./cm.$^3$ and a closed-cell diameter of 0.25 mm., was printed by the same technique as used in Example 1. The printability of this film proved to be very good.

EXAMPLE 5

A closed-cell foamed film, prepared from a copolymer of propylene and ethylene, containing 97 mol percent of propylene and 3 mol percent of ethylene, and having an apparent density of 0.31 g./cm.$^3$ and a cell diameter of 0.1 mm., was printed as set forth in Example 1. In this case also the film had a good printability.

It will be obvious to those skilled in the art that various changes may be made without departing from the scope and spirit of the invention and therefore the invention is not to be limited to what is described in the specification but only as indicated in the appended claims.

What is claimed is:

1. A method of manufacturing an object having a printed inert cellular plastic surface, wherein said plastic is selected from the group consisting of polyethylene, polypropylene, copolymers of ethylene and propylene, copolymers of ethylene and at most 20% by weight of another unsaturated compound, copolymers of propylene and at most 20% by weight of another unsaturated compound, and mixtures of said polymers, wherein said unsaturated compound is selected from the group consisting of an unsaturated hydrocarbon other than ethylene and propylene, an acrylate, a methacrylate and a vinyl ester, and having a closed cellular surface, which consists of printing indicia directly upon said closed cellular surface.

2. A method in accordance with claim 1 wherein said object is a film, and said inert plastic is selected from the group consisting of polyethylene, polypropylene, and copolymers of ethylene and vinyl acetate.

3. A method in accordance with claim 1 wherein said object is entirely cellular.

4. A method in accordance with claim 1 wherein said object is formed by extruding said inert plastic with a blowing agent and wherein said coated indicia is a standard printing ink.

5. A method in accordance with claim 1 wherein the average diameter of the cells of said cellular surface is between 0.01 and 2 mm.

6. A method in accordance with claim 5 wherein said diameter is between 0.05 and 0.5 mm.

7. An object having an untreated, inert, closed-cellular plastic surface having indicia printed directly on said closed cellular surface, said plastic being selected from the group consisting of polyethylene, polypropylene, copolymers of ethylene and propylene, copolymers of ethylene and at most 20% by weight of another unsaturated compound, copolymers of propylene and at most 20% by weight of another unsaturated compound, and mixtures of said polymers, wherein said unsaturated compound is selected from the group consisting of an unsaturated hydrocarbon other than ethylene and propylene, an acrylate, a methacrylate and a vinyl ester.

References Cited
UNITED STATES PATENTS

| | | | |
|---|---|---|---|
| 3,019,201 | 1/1962 | Clancy et al. | 260—2.5 |
| 3,059,987 | 10/1962 | Baumann | 260—2.5 X |
| 3,281,259 | 10/1966 | Lux et al. | 117—38 X |

OTHER REFERENCES

Du Pont Dyes and Chemicals Technical Bulletin, vol. 18(2), pp. 89–93, 1962.

WILLIAM D. MARTIN, *Primary Examiner.*

MURRAY KATZ, *Examiner.*

J. E. MILLER, *Assistant Examiner.*